Inventors:
Harry S. Sechrist,
Murray Rosenblatt,
by J. Wesley Hauber
Their Attorney.

United States Patent Office 2,748,337
Patented May 29, 1956

2,748,337

ELECTRICAL REGULATORS

Harry S. Sechrist and Murray Rosenblatt, Schenectady, N. Y., assignors to General Electric Company, a corporation of New York Application May 14, 1953, Serial No. 355,042

4 Claims. (Cl. 321—16)

This invention relates to regulators, and more particularly to regulators for maintaining electrical quantities or characteristics constant at a predetermined value, and it has for an object the provision of a simple, reliable and improved device of this character.

Still more particularly, the invention relates to regulators for maintaining alternating electrical quantities such as current or voltage constant at a predetermined value and in which a direct signal control voltage is derived from the regulated electrical quantity by means of a metallic rectifier which has a negative temperature coefficient resistance characteristic, and a more specific object of the invention is the provision of means for compensating the regulator for the error that would be produced in its output as a result of changes in the ambient temperature if no correction were made.

Still another object of the invention is the provision of means for compensating the regulator for the error that would be produced in its output as a result of aging of the rectifier.

In carrying the invention into effect in one form thereof, a metallic rectifier having a negative temperature coefficient resistance characteristic is utilized for deriving a direct signal control voltage from the electrical quantity to be regulated, and supplying such signal voltage to a voltage comparison network in which a selectable portion of the signal voltage is compared with a direct reference voltage of constant magnitude. The difference of the reference voltage and the selected portion of the signal voltage is amplified by suitable amplifying means and the amplified difference is utilized to correct for any departures of the regulated quantity from the predetermined desired value. To compensate for any changes in the output voltage of the regulator which result from changes in the ambient temperature, a rectifier similar to that from which the network is supplied and having an identical negative temperature coefficient resistance characteristic is connected in the signal voltage arm of the voltage comparison network.

For a better and more complete understanding of the invention, reference should now be had to the following specification and to the accompanying drawing of which:

Figure 1:
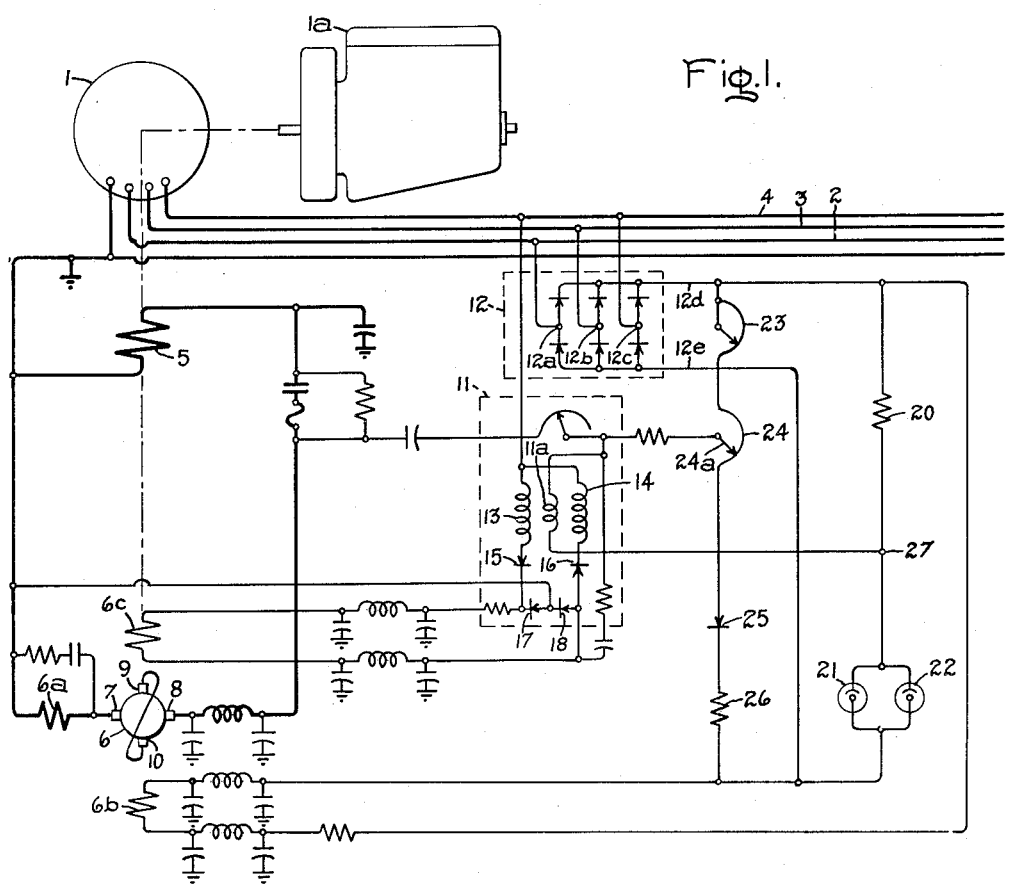
Fig. 1 is a simple diagrammatical illustration of an embodiment of the invention.

In illustrating the invention in one form thereof, it is shown as embodied in a voltage regulating system for an alternating voltage generator 1. This generator is driven by any suitable driving means such as an internal combustion engine 1a which is indicated conventionally in the drawing. This engine driven generator 1 may be used as a ground power supply for aircraft. As such, it is used out-of-doors and in latitudes in which the out-of-door temperature may vary over a range of 140 or more degrees Fahrenheit throughout the year and in which the temperature range in a single 24-hour period may be as much as 100 degrees in going from a heated hanger to out-of-doors. The generator is driven at a speed which is preferably substantially constant. It is illustrated as a 3-phase generator with a grounded neutral and its terminals are connected to supply 3-phase voltage to the supply conductors 2, 3 and 4.

It is provided with a separately excited field winding 5 which is connected to be excited from an exciter 6 which is preferably an amplidyne having load brushes 7 and 8 on its load axis and short-circuited brushes 9 and 10 on an axis at right angles to the load axis. The exciter 6 is provided with a series field winding 6a, a boost field winding 6b, and a buck field winding 6c whose magnetic axes preferably coincide with the load axis of the machine. The advantages of the amplidyne type of exciter in a regulating system are its high amplification factor and its exceptionally high speed of response.

As shown in the drawing, the buck field winding 6c of the exciter is supplied with direct voltage from a suitable amplifier such as the magnetic amplifier 11, and the boost field winding 6b is supplied with direct voltage from a rectifier 12 which in turn is supplied from the supply conductors 2, 3 and 4.

The magnetic amplifier 11 may be of any suitable type. However, it is illustrated as a single phase, full wave, self-saturating, bridge type magnetic amplifier, with direct voltage output. It comprises a pair of main reactance windings 13 and 14 of which each is wound upon a different outside leg of a three legged magnetic core (not shown) and four rectifiers 15, 16, 17, and 18, which may be of any suitable type, but which are preferably metallic surface contact type rectifiers such, for example, as selenium disk rectifiers, copper oxide rectifiers or germanium rectifiers. The reactance winding 13 and a rectifier 15 constitute one arm of a bridge network and the winding 14 and rectifier 16 constitute a second arm. Rectifiers 17 and 18 constitute the third and fourth arms respectively. As shown, the four rectifiers are poled to provide a direct voltage output supply to the buck field winding 6c of the amplidyne.

For controlling the degree of saturation of its core, and thereby controlling the magnitude of its output voltage, the magnetic amplifier 11 is provided with an input control winding 11a which is wound on the middle leg or legs of the core. This winding is supplied from a voltage comparison network which in turn is supplied from the signal voltage supply rectifier 12.

This rectifier 12 is illustrated as comprising six individual rectifiers connected in a 3-phase, double-way connection. Each of the six rectifiers is a metallic type rectifier. Preferably, each is a stack of selenium cells, although copper oxide rectifier stacks or germanium rectifiers could also be used. The input terminals 12a, 12b, and 12c, are connected to the 3-phase supply conductors 2, 3 and 4.

Figure 2:
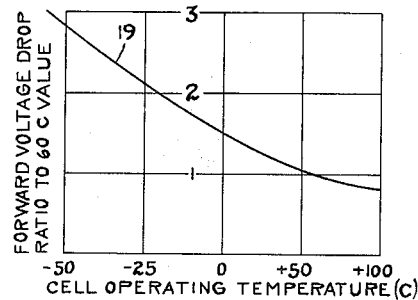
Fig. 2 is a graph of a negative temperature coefficient resistance characteristic of a metallic rectifier such as used for the supply rectifier for the voltage comparison network and for the compensating rectifier which facilitates an understanding of the operation of the invention.
Figure 3:
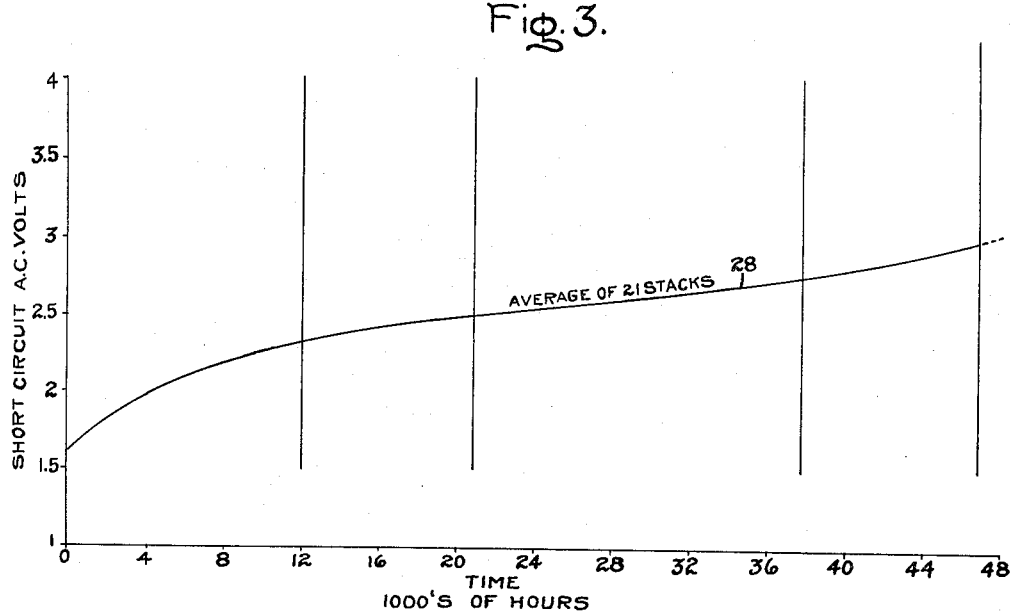
Fig. 3 is a typical graph of the aging characteristic of such a rectifier.

The negative temperature coefficient resistance characteristic of a selenium rectifier is graphically represented in Fig. 2 by the curve 19 of which ordinates represent the forward voltage drop ratio to the 60 degree centigrade value, and abscissae represent temperature in degrees centigrade. It is to be noted that the resistance decreases with increasing temperature and that the characteristic is non-linear.

The voltage comparison network comprises a reference voltage arm and a signal voltage arm which are connected in parallel with each other across the output terminals of the signal voltage rectifier 12. A fixed resistor 20 and an electronic voltage regulating unit connected in series relationship constitute the reference voltage arm. The electronic unit comprises a pair of voltage stabilizing glow valves 21 and 22 which are connected in parallel with each other. These valves have anodes and cathodes mounted in an envelope which contains a mixture of inert gases. These valves have the characteristic that over a wide range of values, e. g., 5–40 milliamperes of glow discharge current, the voltage drop between the anode and cathode of each of the valves remains substantially constant. The voltage drop also remains constant over a very large change in ambient temperature.

The signal voltage arm of the network is a voltage divider which comprises adjustable resistors 23 and 24, a metallic rectifier 25 and a fixed resistor 26 connected in series relationship with each other. The metallic rectifier 25 is similar to each of the six individual rectifiers which constitute the 3-phase rectifier 12, i. e., it is made of the same material, which in this case is assumed to be selenium, and it therefore has the identical negative temperature coefficient resistance characteristic of the rectifier 12 which is illustrated in Fig. 2. It is poled to conduct current through the voltage divider from the positive terminal 12d to the negative terminal 12e. One terminal of the saturation control winding 11a of the magnetic amplifier is connected to the slider 24a of the adjustable resistor 24 and its other terminal is connected to the junction point 27 between resistor 20 and the anodes of voltage regulator valves 21 and 22. Thus a current is caused to flow in the circuit of the control winding 11a which is proportional to the difference between the constant reference voltage across the valves 21 and 22 and the signal voltage between the negative terminal 12e and the slider 24a. The component parts of the voltage comparison network including the metallic rectifier 25 in the signal voltage arm are mounted on the same panel with the rectifier 12, and thus the rectifier 25 and the rectifier 12 are subjected to the same ambient temperature.

With the foregoing understanding of the elements and their organization in the complete system, the operation of the system itself will readily be understood from the following description. The resistor 24 may be calibrated in terms of the generator voltage. Thus the value at which the generator voltage is to be maintained constant may be adjusted to any desired value within the range of operating values by adjusting the slider to a corresponding position on the adjustment scale.

In the balanced condition of the system, the generator voltage will have the desired value corresponding to the setting of the slider 24a when the voltage of the slider 24a with respect to the voltage of the negative terminal 12e is equal to the voltage of the anodes of the valves 21 and 22 with respect to the negative terminal.

If the generator voltage rises above the preset value, the voltage of the slider 24a will become more positive than the voltage of the point 27. As a result, current will flow in the control winding 11a of the magnetic amplifier in a direction which causes the core of the magnetic amplifier to become saturated slightly earlier in each half cycle of the pulsating direct current which flows in the reactance windings 13 and 14. Consequently, their reactance is decreased and the output voltage which is supplied to the buck field winding 6c of the amplidyne is correspondingly increased. As a result, the net excitation of the amplidyne, and likewise the net excitation of the generator 1, are correspondingly decreased. In response to the decrease in the excitation of the generator, its voltage decreases until a balanced condition of the system is re-established with the voltage of the slider 24a substantially equal to but slightly greater than the voltage of the point 27.

If the voltage of the generator decreases below the predetermined desired value set by the slider 24a, the voltage of the slider will become more negative than the voltage of the point 27 and current will flow in the reverse direction in the circuit of the saturation control winding 11a. As a result, the core of the magnetic amplifier will saturate later in each half cycle of the pulsating direct current which flows in the reactance windings. This causes their reactance to increase which in turn produces a decrease in the current supplied to the buck field winding 6c of the amplidyne. Thus, the net excitation of the amplidyne and the net excitation of the generator are increased. In response to increased excitation, the generator voltage increases until the balanced condition is re-established with the voltage of the slider 24a substantially, but not exactly equal to the reference voltage of the point 27.

If the ambient temperature varies, the resistance of the rectifier 12 will vary in accordance with the negative temperature coefficient resistance characteristic which is represented by the curve 19 of Fig. 2. For example, if the temperature rises, the resistance of the rectifier 12 will decrease in accordance with the curve and thus its direct voltage output will increase. As a result, the portion of this direct output voltage which is derived between the negative terminal 12e and the slider 24a tends to increase, and would increase unless offset or counteracted. Such increase in the signal voltage resulting from an increase in the ambient temperature would, of course, produce the same regulating action that would have been produced if the generator voltage had actually increased above the desired preset value. In other words, the regulator would act to decrease the generator voltage and in so acting would decrease it below the desired preset value. However, the tendency of the signal voltage between the negative terminal 12e and the slider 24a to increase as a result of the increase in ambient temperature is exactly counteracted by the action of the compensating rectifier 25. As the ambient temperature rises, the resistance of the rectifier 25 decreases in accordance with the same characteristic as that of rectifier 12 and thus a smaller fraction of the total direct voltage output of the rectifier 12 appears between the negative terminal 12e and the slider 24a. In order that 100 per cent compensation for changes in the input rectifier shall be achieved, it is necessary that the resistance of the rectifier 25 shall have the same ratio to the total amount of resistance of one phase of the rectifier 12 that the voltage between the negative terminal 12e and the slider 24a has to the total direct output voltage of the rectifier 12 when the generator voltage is equal to the desired preset value. For example, if the voltage comparison network is designed to compare 50 per cent of the output voltage of the rectifier 12 with the reference voltage across the glow valves 21 and 22, then the resistance of the compensation rectifier 25 should be equal to 50 per cent of the resistance of one phase of the rectifier 12. It will be understood that changes in the output voltage of the rectifier 12 do not affect the reference voltage across the reference voltage valves 21 and 22 since this voltage remains constant over a wide range of current values.

If the ambient temperature decreases, the resistance of the rectifier 12 increases thereby decreasing the output voltage and the signal voltage between the negative terminal and the slider 24a correspondingly. If not compensated, this decrease in the signal voltage would cause the regulator to operate to increase the generator voltage above the desired predetermined value by the amount required to restore balance in the voltage comparison network. However, the rectifier 25 is subject to the same decrease in ambient temperature and its resistance therefore increases so that an increased proportion of the decreased output voltage of the rectifier 12 appears between the negative terminal 12e and the slider 24a. Thus the rectifier 25 effects 100 per cent compensation for changes in the output voltage of rectifier 12 resulting from changes in ambient temperature. In other words, the voltage at the slider 24a is unaffected by changes in ambient temperature of the signal voltage supply rectifier 12 and thus no error is introduced into the operation of the regulator as a result of such changes in ambient temperature. Any amount of compensation other than 100% may be obtained by properly selecting the compensating rectifier. This compensating rectifier 25 may also be used to compensate other rectifier type components elsewhere in the circuit.

The forward resistance of a selenium cell rectifier increases with age as illustrated by the average characteristic curve 28 of which abscissae represent time in thousands of hours of use and ordinates represent voltage drop across two cells in series as determined by supplying alternating voltage of sufficient magnitude to a single phase full wave rectifier bridge with one cell in each leg to pass rated direct current with the direct current terminals short-circuited. As seen from curve 28 the forward resistance inceases with time of use and the increase is non-linear. Consequently, the rectifier 12 supplies to the voltage comparison circuit a voltage which decreases with increasing use although the voltage at the supply conductors 2, 3 and 4 does not deviate from the desired predetermined value. This decreasing voltage tends to introduce an error in the operation of the regulator. However, the compensating rectifier 25 compensates for and completely counteracts the decrease in voltage supplied to the comparison circuit in the same manner that it compensates for the error which is produced by increasing resistance resulting from decreasing ambient temperature as previously explained.

It will also be appreciated that errors which tend to result from time of non-use, i. e., the mere lapse of time without use will be compensated in the same manner.

Although in accordance with the provisions of the Patent Statutes this invention is described as embodied in concrete form and the principle of the invention has been explained together with the best mode in which it is now contemplated applying that principle, it will be understood that the drawings and description are merely illustrative and that the invention is not limited thereto since alterations and modifications will readily suggest themselves to persons skilled in the art without departing from the true spirit of this invention or the scope of the annexed claims.

What we claim as new and desire to secure by Letters Patent of the United States is:

1. A device for regulating an electrical quantity comprising a metallic rectifier having a negative temperature coefficient resistance characteristic, a voltage comparison network comprising a source of substantially constant direct reference voltage having its negative terminal connected to the negative output terminal of said rectifier, a source of variable signal voltage comprising a voltage divider connected across the output terminals of said rectifier and having an intermediate voltage tap, network output voltage terminals connected to the positive terminal of said reference voltage source and to said intermediate tap, and means for compensating the output voltage of said comparison network for variations resulting from variations in the ambient temperature of said rectifier comprising a second metallic rectifier included in said voltage divider between said negative terminal and said voltage tap and having a negative temperature coefficient resistance characteristic substantially identical with said characteristic of said first rectifier.

2. A device for regulating an electrical quantity comprising a metallic rectifier having a negative temperature coefficient resistance characteristic, a voltage comparison network comprising a voltage drop device and a source of substantially constant direct reference voltage connected in series with each other across the direct voltage output terminals of said rectifier, said reference voltage source comprising an electric valve having its cathode connected to the negative terminal of said rectifier and its anode connected to one terminal of said voltage drop device, said valve having a voltage current characteristic of which the voltage remains essentially constant throughout a range of current values, a source of variable signal voltage comprising a voltage divider connected across the terminals of said rectifier and having an intermediate voltage tap, network output voltage terminals connected to said voltage tap and to said anode, and means for compensating the output voltage of said comparison network for changes in the ambient temperature of said rectifier comprising a second metallic rectifier included in said voltage divided between said voltage tap and said negative terminal having a negative temperature coefficient resistance characteristic substantially identical with the characteristic of said first rectifier and poled to render said voltage divider conducting.

3. A device for regulating an electrical quantity comprising a first metallic rectifier having a negative temperature coefficient resistance characteristic, a voltage comparison network having connected in parallel with each other a signal voltage arm comprising a voltage divider, and a reference voltage arm, electrical supply connections from said rectifier to each of said parallel connected arms, an electric valve connected in said reference voltage arm and having a voltage current characteristic of which the voltage remains constant throughout a relatively wide range of current values, output voltage terminals connected to a terminal of said valve and to an intermediate tap of said signal voltage arm for deriving from said network an output voltage proportional to the difference of said reference voltage and the voltage between said tap and a terminal of said signal voltage arm, and means for compensating said output voltage for changes in the output voltage of said rectifier produced by changes in its ambient temperature comprising a second metallic rectifier connected in said signal voltage arm and having a negative temperature coefficient resistance characteristic substantially identical with the characteristic of said first rectifier.

4. In a device for maintaining an electrical quantity substantially constant, a first metallic rectifier supplied from a source of alternating voltage subject to substantial variations in its effective value and having a negative temperature coefficient resistance characteristic, a voltage comparison network supplied from said rectifier and comprising a reference voltage arm and a signal voltage arm connected in parallel with each other across the output terminals of said rectifier, said reference voltage arm comprising connected in series relationship with each other a voltage drop resistor and an electric valve having its cathode connected to the negative output terminal of said rectifier and having a voltage current characteristic of which the voltage remains substantially constant for relatively large changes in current thereby to produce across its anode and cathode a constant reference voltage, said signal voltage arm comprising a voltage divider having an intermediate voltage tap, output terminals connected to said anode and to said intermediate tap for deriving from said network a voltage equal to the difference of said reference voltage and the voltage between said intermediate voltage tap and said negative terminal and means for compensating said derived voltage for changes in the signal voltage produced by changes in the ambient temperature of said rectifier comprising a second metallic rectifier having a negative temperature coefficient resistance characteristic substantially identical with that of said first rectifier and connected in the portion of said voltage divider between said intermediate voltage tap and said negative terminal.

No references cited.